(No Model.)
P. McHUGH.
NUT LOCK.
No. 576,466. Patented Feb. 2, 1897.
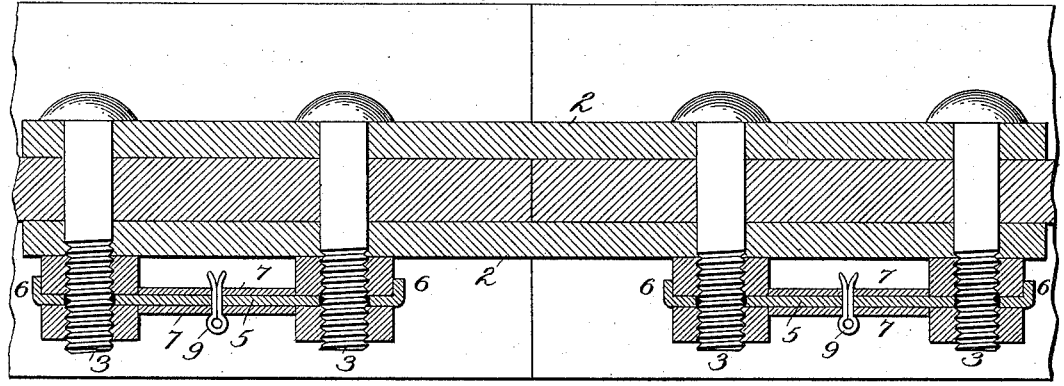
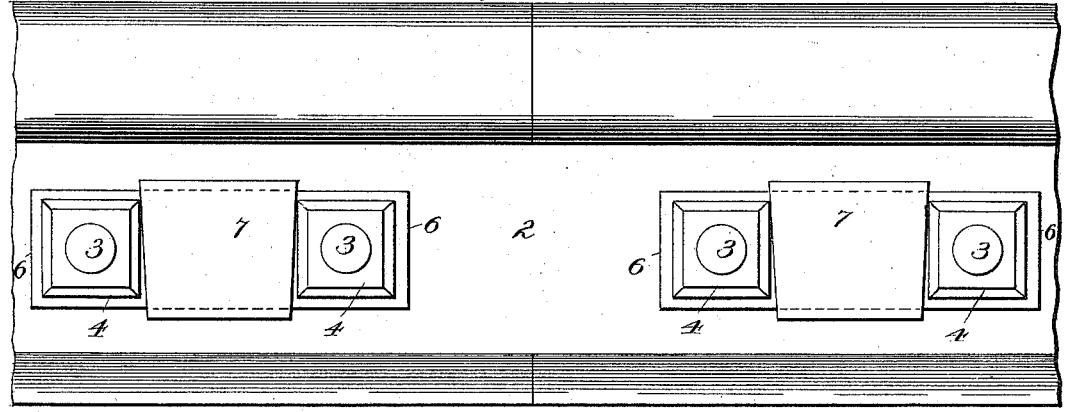
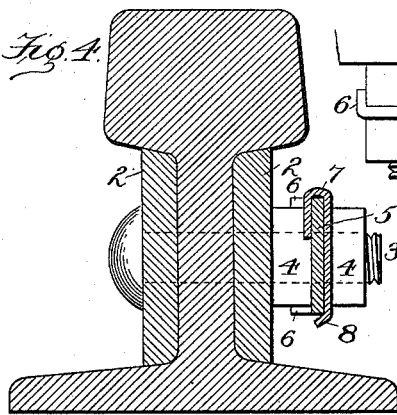
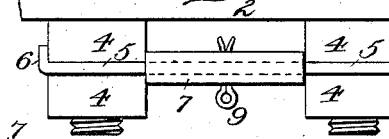
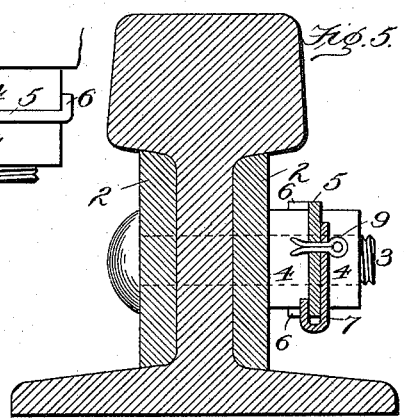
WITNESSES:
INVENTOR
Peter McHugh.
BY
Johnson and Johnson
ATTORNEYS.

UNITED STATES PATENT OFFICE.

PETER McHUGH, OF DYER, TENNESSEE, ASSIGNOR OF ONE-HALF TO HENRY LUKE BIGGS, OF SAME PLACE.

NUT-LOCK.

SPECIFICATION forming part of Letters Patent No. 576,466, dated February 2, 1897.

Application filed September 4, 1896. Serial No. 604,870. (No model.)

*To all whom it may concern:*

Be it known that I, PETER MCHUGH, a citizen of the United States, residing at Dyer, in the county of Gibson and State of Tennessee, have invented a new and useful Improvement in Nut-Locks, of which the following is a specification.

My improvement resides in a construction whereby a pair of bolts are provided, each having double nuts, both of which are locked on the bolt by a key-plate, which also binds and braces the nutted ends of the bolts in relation to each other and also to the fish-plate and the rail to render their connection firmer and stronger, as I will now describe, and particularly point out the precise improvement in the claims concluding this specification.

The accompanying drawings illustrate my improvement, in which—

Figure 1 shows in horizontal section my improved locking device for double nuts as applied to a pair of bolts and the fish-plate of a railway-joint. Fig. 2 shows a side view of the same. Fig. 3 is a top view of the double nut-lock, and Fig. 4 is a vertical cross-section of the same. Fig. 5 is a like view showing the key as applied in a reversed position.

While I have illustrated the double nut-lock device as applied to the fish-plate of a railroad-rail joint, the device is obviously applicable to machinery where bolts are used in pairs with double nuts and the nuts are subject to jarring.

2 are the fish-plates, which cross the rail-joint and are secured to each rail by a pair of bolts 3 3, each secured by double nuts 4 4, bound against the fish-plate. Instead of driving the outer nut upon the inner one I place upon the pair of bolts and against the inner nuts a plate 5, having its ends 6 6 bent inward over and upon the sides of the inner nuts, which, having been driven home, are thereby locked upon the bolts against the fish-plate. Upon this locking-plate the outer nuts are driven on their bolts and each nut is locked by a key 7, placed or hung upon the lock-plate between the nuts so as to engage them. A simple construction of key for this purpose is a U-shaped plate adapted to fit upon and over the locking-plate somewhat like a saddle, with the lapping edges of the plate abutting alike against the walls of the inner and the outer nuts of each bolt. I prefer to drive the key hard upon the locking-plate and against the nuts on both sides of said plate, because thereby the key will serve to brace the nutted ends of the bolts. This bracing function is shown in Fig. 2, wherein the key-plate 7 is seen as wedge-shaped in the direction of its fold and as driven down between and against the nuts 4 4, and in Fig. 3, wherein the double ends of the folded key-plate are seen as abutting alike against the inner and the outer nuts, and in this way the nutted ends of the bolts are given a firmer connection with the fish-plate and with the rail.

The locking-plate and the key-plate are of sufficient thickness to give them the stiffness of braces, so that in driving the wedge-plate its binding action will be upon both nuts of each bolt and upon the upset ends 6 6 of the locking-plate. Moreover, the firmness of the bracing action of the wedge-key upon the double nuts of each bolt is rendered more effective by the abutting action of the key equally upon both nuts.

The outer leaf or side of the key I prefer to make wider than the width of the locking-plate, so as to extend below it, that this side of the key may be upset, as at 8, Fig. 4, beneath the locking-plate and thereby lock the key to it, or the key may be of less width than the locking-plate and pinned to it.

Instead of seating the key upon the upper edge of the lock-plate it may be applied to the under side of the latter, in which case one end of the key will be upset to allow it to be first slipped under and its bent end applied to the inner side of the lock-plate and between the inner nuts, and the outer end of the key upset between the outer nuts to lock them. In this case the key at its bend may rest upon the flange of the rail and is thereby secured in position between the nuts, or the key may be secured to the locking-plate by a cotter-pin 9 or equivalent fastening passed through holes in the key and plate.

I claim as my improvement—

1. A nut-locking device and brace for a pair of bolts, consisting of the bolts, the double nuts on each bolt, a plate engaging the bolts between the nuts and having its ends engaging the outer sides of the inner nuts of each bolt and a U-shaped plate having one of its folded parts abutting against the inner nuts and the other abutting against the outer nuts on their walls between the bolts thereby forming, with the bolt-engaging plate, a lock for both nuts and a brace for the nutted ends of the bolts, as shown and described.

2. In a nut-lock, the combination with the rail and the fish-plate, of a pair of bolts and the double nuts on each bolt, a plate engaging the bolts between the nuts and having its ends engaging the outer walls of the inner nuts of each bolt, and a plate U-shaped in cross-section and wedge-shaped lengthwise whereby it is adapted to be driven upon the bolt-engaging plate with its double ends against the walls respectively of the inner and the outer nuts between the bolts to bind and brace their nutted ends in relation to the fish-plate and the rail.

PETER McHUGH.

Witnesses:
E. T. MEADE,
L. L. DAVIDSON.